United States Patent
Lee et al.

(10) Patent No.: US 11,003,885 B1
(45) Date of Patent: May 11, 2021

(54) HIGH-PRECISION FINGERPRINT SENSING METHOD

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days.

(21) Appl. No.: 16/783,330

(22) Filed: Feb. 6, 2020

(51) Int. Cl.
*G06K 9/00* (2006.01)
(52) U.S. Cl.
CPC .................................. *G06K 9/0002* (2013.01)
(58) Field of Classification Search
None
See application file for complete search history.

(56) References Cited

U.S. PATENT DOCUMENTS

| | | | | |
|---|---|---|---|---|
| 2016/0110581 | A1* | 4/2016 | Heo | G06K 9/0002 382/124 |
| 2016/0342824 | A1* | 11/2016 | Lee | H05K 1/0296 |
| 2017/0006245 | A1* | 1/2017 | Akhavan Fomani | G06K 9/0002 |
| 2017/0017828 | A1* | 1/2017 | Bernstein | G06K 9/0002 |
| 2017/0286739 | A1* | 10/2017 | Shibano | G06K 9/0002 |

FOREIGN PATENT DOCUMENTS

| | | |
|---|---|---|
| CN | 104978559 A | 10/2015 |
| TW | 201734884 A | 10/2017 |

OTHER PUBLICATIONS

Office Action dated Dec. 31, 2020 of the corresponding Taiwan patent application No. 108146752.

* cited by examiner

*Primary Examiner* — Nicholas J Lee
(74) *Attorney, Agent, or Firm* — Chun-Ming Shih; HDLS IPR Services (57) ABSTRACT

A high-precision fingerprint sensing method includes providing a fingerprint sensor (10) having a plurality of transistor switches (Q), a plurality of sensing electrodes (SE), a plurality of gate lines (GL), a plurality of data lines (DL), arranging at least one sampling conductor (SC) near the gate lines (GL) to form a coupling capacitance between the sampling conductor (SC) and the gate lines (GL) and to render the sampling conductor (SC) sensing noise on the adjacent gate lines (GL), inverting the noise signal (Vn) obtained from the sampling conductor (SC) into a noise-suppressing signal (Vc) and sending the noise-suppressing signal (Vc) to the fingerprint sensor (10) to suppress noise of the fingerprint sensor (10) and enhance fingerprint sensing accuracy.

17 Claims, 9 Drawing Sheets

HIGH-PRECISION FINGERPRINT SENSING METHOD

BACKGROUND OF THE INVENTION

1. Technical Field

The present invention relates to a fingerprint sensing method, especially to a high-precision fingerprint sensing method enhancing accuracy by sensing noise.

2. Description of Prior Art

Biometric identification technologies have rapid development due to the strong demand from electronic security applications and remote payment. For the considerations of efficiency, safety and non-invasiveness, the fingerprint identification becomes main stream technology. The fingerprint identification device can scan fingerprint image by optical scanning, thermal imaging, supersonic sensing, or capacitive imaging. For cost, power-saving, reliability and security concerns, the capacitive fingerprint sensor becomes popular for biometric identification technology applied to portable electronic devices.

Large-area pressing-type fingerprint identifying apparatus is top choice for identification in financial payment and administrative process. However, the chip-based fingerprint identifying apparatus for whole finger has high cost and has risk of damage. Therefore, TFT-based fingerprint identifying apparatus for whole finger becomes development trend. However, the TFT-based fingerprint identifying apparatus has lots of noise and internal capacitance. The gate lines extended across all of the sensing area will sense ambient noise from user finger and the sensed noise is coupled to other sensing electrode through inter-electrode capacitance of transistor switches. The omnipresent noise will influence the sensing accuracy.

It is desirable to provide a low-cost, high performance, low-noise and high-precision fingerprint sensing method, which overcomes the large noise coupled to the sensing electrodes through the inter-electrode capacitance of transistor switches and the large noise coupled to the power source conductor of the fingerprint sensor through stray capacitance, thus greatly enhance signal to noise ratio and the fingerprint sensing accuracy.

SUMMARY OF THE INVENTION

Accordingly, the present invention provides a high-precision fingerprint sensing method, comprising: providing a fingerprint sensor, the fingerprint sensor comprising: a plurality of transistor switches, a plurality of sensing electrodes, each of the sensing electrodes electrically connected to sources or drains of at least two transistor switches; a plurality of gate lines, each of the gate lines electrically connected to gates of the transistor switches; a plurality of data lines, each of the data lines electrically connected to the sources or the drains of the transistor switches; providing at least one sampling conductor near the gate lines, a coupling capacitance formed between the sampling conductor and each of the gate lines such that the at least one sampling conductor senses noise signal from the adjacent gate lines; providing a fingerprint sensing circuit, the fingerprint sensing circuit sequentially or randomly selecting at least one sensing electrode as selected sensing electrode and reading a fingerprint sensing signal from selected data line for fingerprint sensing; inverting the noise signal sensed by the sampling conductor to form a noise-suppressing signal and supplying the noise-suppressing signal to the fingerprint sensor, whereby noise in the fingerprint sensor is eliminated and fingerprint sensing accuracy is enhanced.

The high-precision fingerprint sensing method of the present invention can use the major noise sensed by the sampling conductor, invert-amplify the noise and then apply the invert-amplified noise to major conductor to eliminate the noise in the fingerprint sensor.

DETAILED DESCRIPTION OF THE INVENTION

Reference will now be made to the drawing figures to describe the present disclosure in detail. It will be understood that the drawing figures and exemplified example of present disclosure are not limited to the details thereof.

Figure 3:
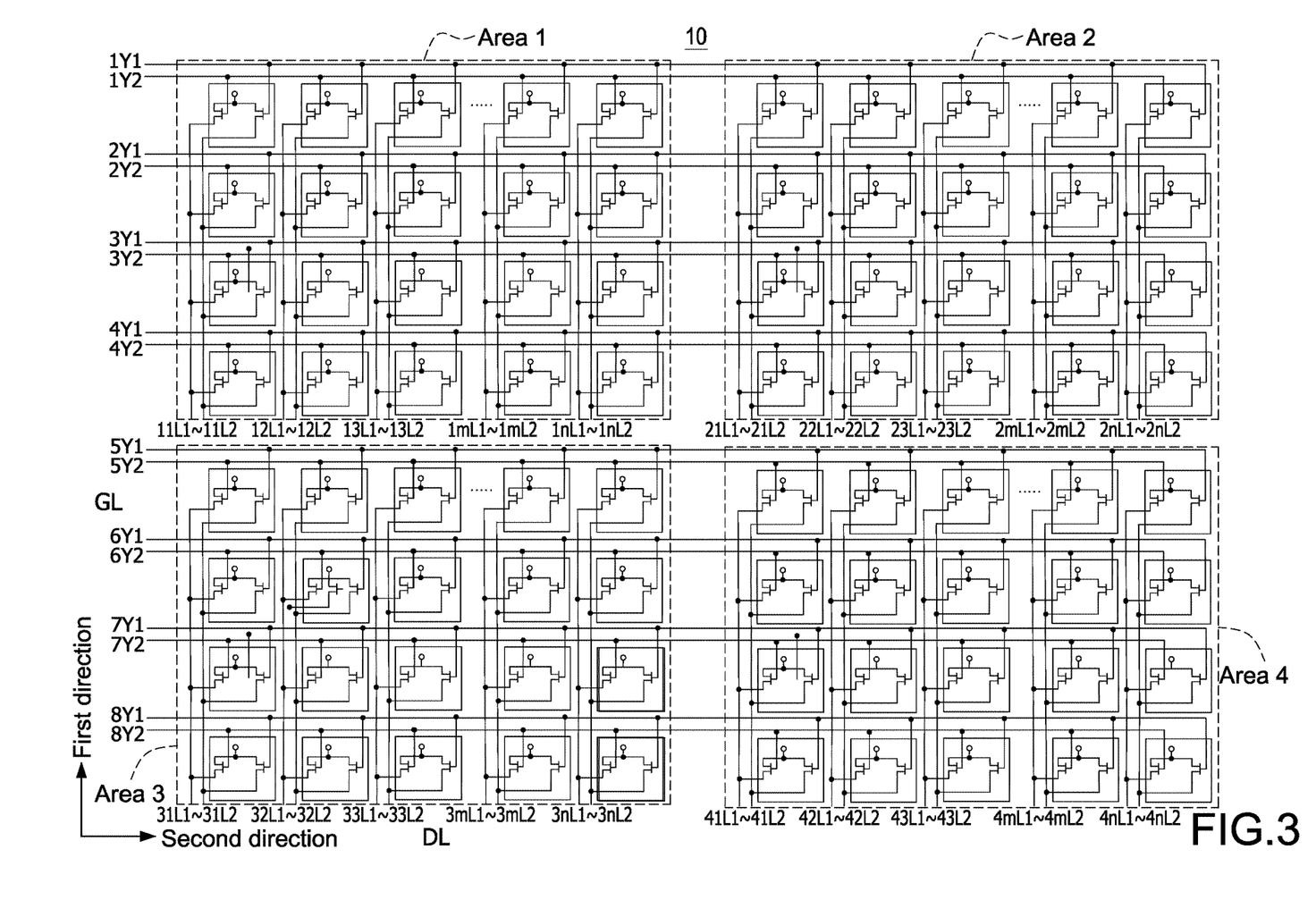
FIG. 3 shows the schematic view of the fingerprint sensor.

Refer to FIG. 3, this figure shows the schematic view of the fingerprint sensor 10. The fingerprint sensor 10 includes a plurality of areas. Although the fingerprint sensor 10 in FIG. 3 includes four areas, this is only for demonstration and not limitation of the present invention. Each area includes a plurality of sensing electrodes (not labelled and the detailed description thereof will be made later), and each sensing electrode is accompanied with two transistor switches for switching sensing operation and switching the application of noise-suppressing signal. However, depending on practical need, each sensing electrode may be accompanied with more transistor switches. As shown in FIG. 3, the fingerprint sensor 10 is divided into four areas. Taking area 1 as example, it further includes a plurality of gate lines 1Y1, 1Y2, 2Y1, 2Y2, 3Y3, 3Y2, 4Y1, 4Y2, and a plurality of data lines 11L1~11L2, 12L1~12L2, 13L1~13L2 . . . 1mL1~1mL2, 1nL1~1nL2, where m=n−1. By above wiring manner, the fingerprint sensor 10 may control the turning on/off of the first row of gates through the gate lines 1Y1 and 1Y2, respectively send data to the two transistor switches for each of sensing electrodes in the first column through the data line 11L1~11L2. Therefore, the fingerprint sensor 10 may sequentially or randomly select (through the gate line) at least one sensing electrode for fingerprint sensing, and receive a fingerprint sensing signal through the data line for fingerprint sensing. The connection of gate line and data line, and the control of the transistor switch for other area can be constructed in the same or similar manner as area 1. In the present invention, by providing at least two transistor switches for each sensing electrode, the sensing electrodes can be set as "selected sensing electrodes" or "non-selected sensing electrodes". Besides, by the control of the transistor switches, noise-suppressing signal can be supplied to part of or all of the non-selected sensing electrodes, which will be detailed later.

Figure 1:
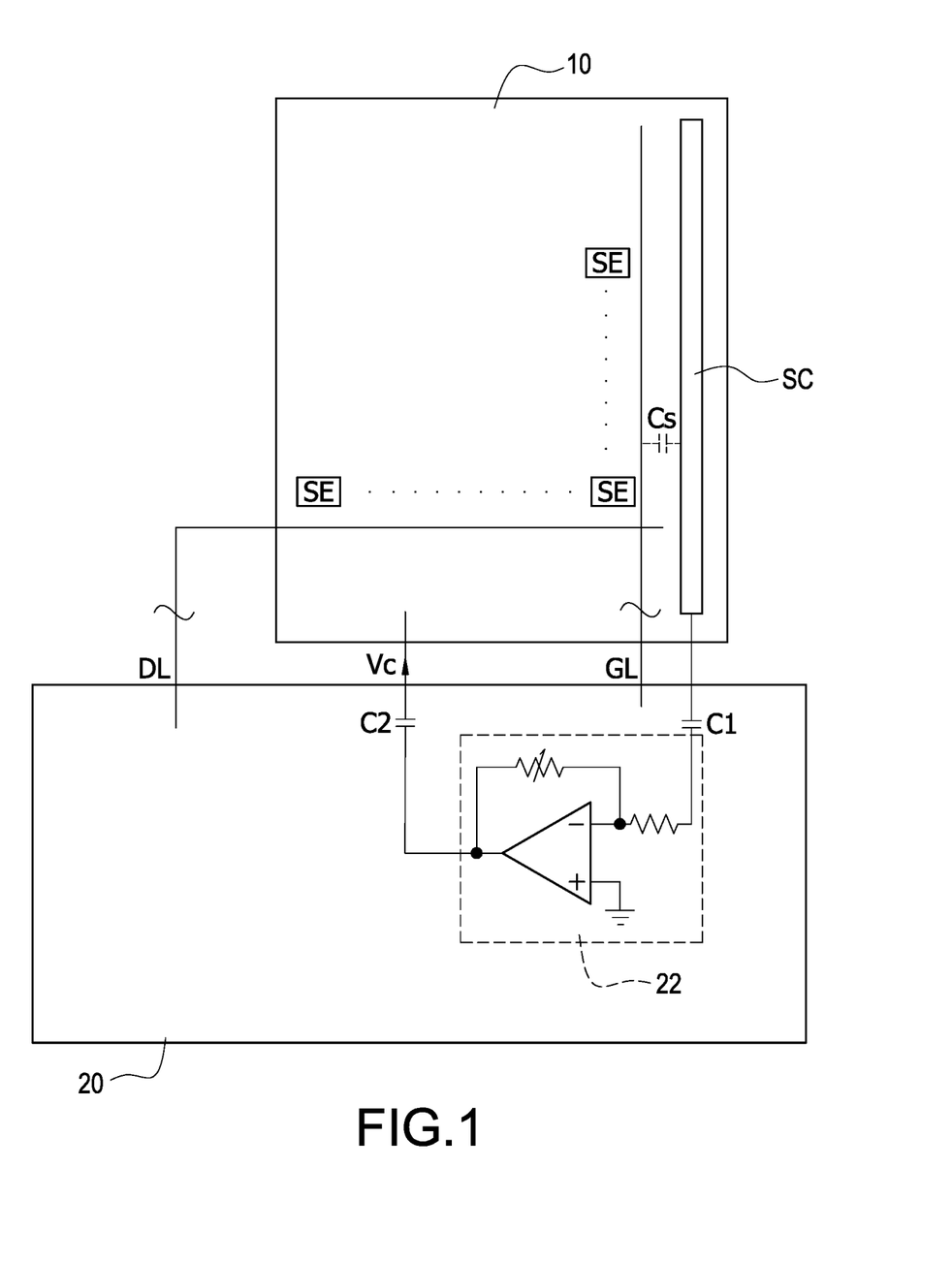
FIG. 1 shows the hardware applicable to the high-precision fingerprint sensing method of the present invention.

Refer to FIG. 1, this figure shows the hardware applicable to the high-precision fingerprint sensing method of the present invention. According to the method of the present invention, at least one sampling conductor SC is provided in the fingerprint sensor 10 and the sampling conductor SC is adjacent to the gate lines GL of the transistor switches. Even though FIG. 1 only shows one sampling conductor SC, according to another embodiment, there are multiple sampling conductors. According to still another embodiment, each sampling conductor SC is of elongated strip shape and parallel to the gate line. According to still another embodiment, the size of the sampling conductor SC is 10-100 times of one single sensing electrode or even larger. Moreover, as shown in FIG. 1, a coupling capacitance Cs is formed between the sampling conductor SC and the gate line GL such that the sampling conductor SC may sense a noise signal Vn from the adjacent gate line GL. The noise signal Vn is sent to an inverter circuit (inverting amplification circuit) 22 of a fingerprint sensing circuit 20 and is amplified into a noise-suppressing signal Vc. The fingerprint sensing circuit 20 then sends the noise-suppressing signal Vc to part of or all of the non-selected sensing electrodes or a common node (which will be detailed later), thus eliminate the noise of the fingerprint sensor 10 and enhance the sensing accuracy. In the fingerprint sensor 10, the gate lines arranged all over the sensing area will sense noise from finger and ambient region, and the noise is coupled to each sensing electrode through the inter-electrode capacitance of the transistor switch. As a result, the noise is rampant everywhere and the fingerprint signal is difficult to sense. In the present invention, the major noise signal is inverted (such as inverted amplification) and then sent to part of or all of the non-selected sensing electrodes or a common node, thus eliminate the noise of the fingerprint sensor 10 and enhance the sensing accuracy. In the fingerprint sensor 10, the largest noise source is from the biggest conductor such as the non-selected sensing electrodes (only one or several sensing electrodes are selected for each sensing operation, therefore, most of the sensing electrodes are "non-selected") or the power source conductor. The sensing accuracy can be greatly enhanced if the noise source from that kind of conductor can be eliminated.

According to one possible implementation of the present invention, the inverter circuit 22 is an inverting amplification circuit with programmable gain to invert the noise signal. According to another possible implementation of the present invention, during fingerprint sensing, the gain of the inverting amplification circuit can be gradually adjusted (gradually increase or decrease the amplification gain) to obtain the optimal noise suppressing effect. Moreover, as shown in FIG. 1, the fingerprint sensing circuit 20 may control a plurality of transistor switches (such as the transistor switches shown in FIG. 3) through the data lines DL and the gate lines GL.

Figure 2:
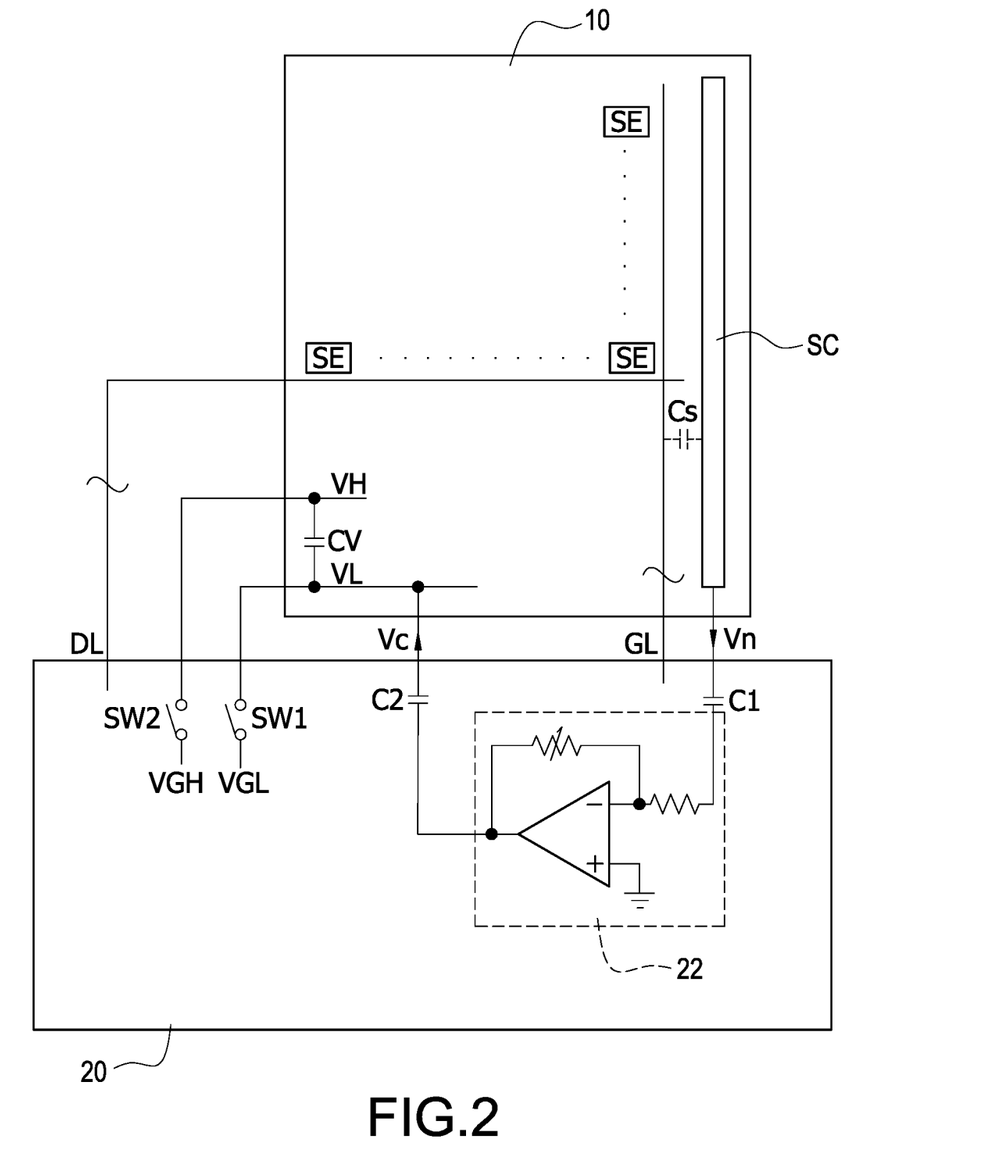
FIG. 2 shows hardware applicable to the high-precision fingerprint sensing method of the present invention.

FIG. 2 shows hardware applicable to the high-precision fingerprint sensing method of the present invention. With also reference to description for FIG. 1, by arranging the sampling conductor SC adjacent to the gate line GL of the transistor switch, a coupling capacitance Cs is formed between the sampling conductor SC and the gate line GL such that the sampling conductor SC may sense a noise signal Vn from the adjacent gate line GL. The noise signal Vn is sent to the inverter circuit 22 of the fingerprint sensing circuit 20 to amplify into the noise-suppressing signal Vc. As mentioned above, the fingerprint sensing circuit 20 then sends the noise-suppressing signal Vc to part of or all of the non-selected sensing electrodes or a common node, thus eliminate the noise of the fingerprint sensor 10 and enhance the sensing accuracy. In the embodiment shown in FIG. 2, the fingerprint sensing circuit 20 then sends the noise-suppressing signal Vc to the DC power end (such as the negative voltage end VL of the DC power source) to eliminate the noise of the fingerprint sensor 10 and enhance the sensing accuracy. In this embodiment, the fingerprint sensing circuit 20 further includes power-switching switches SW1 and SW2, which cut off the electric connection between the power ends VGH, VGL and the fingerprint sensor 10 to prevent the influence of power noise to the sensing accuracy. At this time, the power of the fingerprint sensor 10 is supplied by the capacitance CV (through the positive voltage end VH and the negative voltage end VL). However, the implementation shown in FIG. 2 is only one possible implementation and is not limitation to the present invention.

Figure 4A:
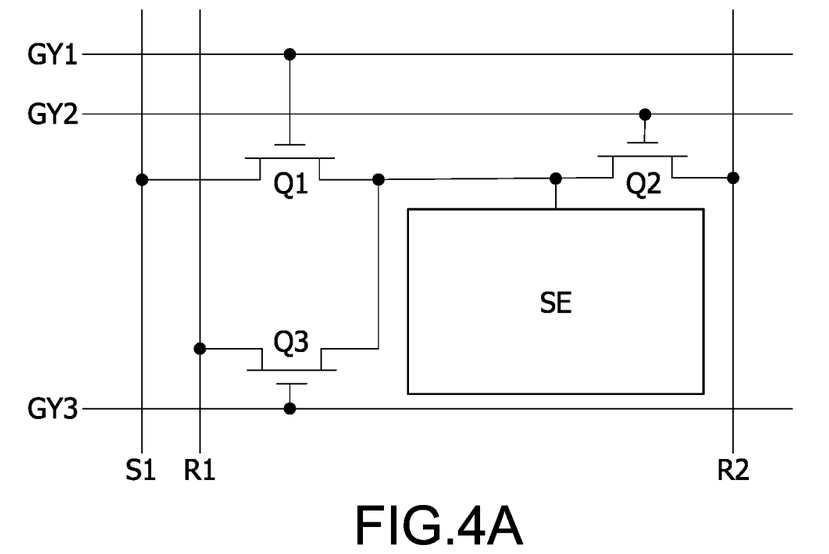
FIG. 4A shows a signal control manner for the transistor switches used in the high-precision fingerprint sensing method.
Figure 4B:
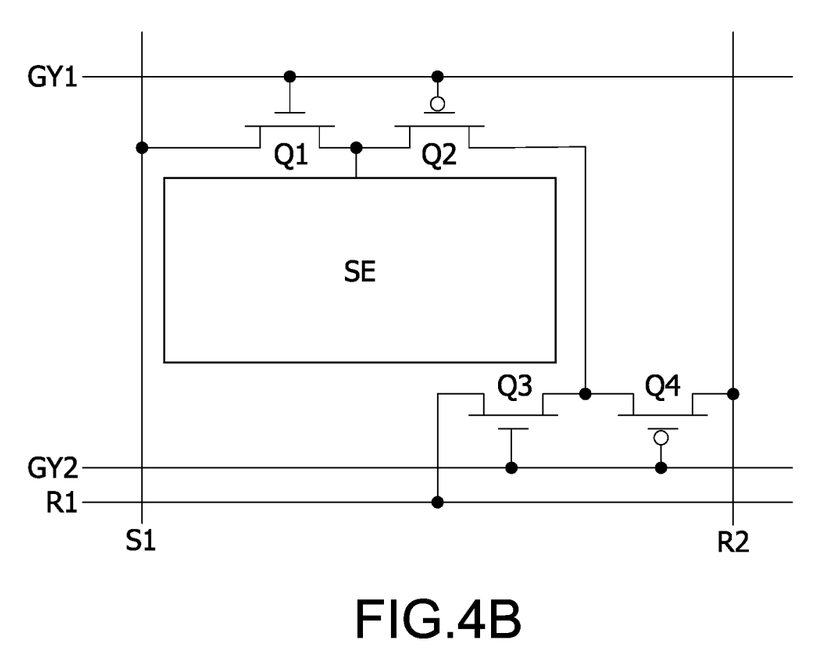
FIG. 4B shows another signal control manner for the transistor switches used in the high-precision fingerprint sensing method.

Refer to FIGS. 4A and 4B, where FIG. 4A shows a signal control manner for the transistor switches used in the high-precision fingerprint sensing method, and FIG. 4B shows another signal control manner for the transistor switches used in the high-precision fingerprint sensing method. As shown in FIG. 4A, when the sensing electrode SE is selected for sensing fingerprint, the signal at the gate line GY1 is logical high. The transistor switch Q1 is turned on and the capacitance excitation signal is sent to the sensing electrode SE through the signal line S1 and the transistor switch Q1. Besides, at the same time, the fingerprint sensing signal detected at the sensing electrode SE is sent to the reading circuit through the transistor switch Q1 and the signal line S1. At this time, the gate lines GY2 and GY3 are logical low.

When the sensing electrode SE is non-selected for capacitance sensing, the gate lines GY1 and GY2 are logical low, while the gate line GY 3 is logical high. Therefore, the transistor switch Q3 is turned on, a DC signal or an alternating suppressing signal is sent to the non-selected sensing electrode SE through the signal line R1 and the transistor switch Q3. Alternatively, when the sensing electrode SE is non-selected for capacitance sensing, the gate lines GY1 and GY3 are logical low, while the gate line GY 2 is logical high. Therefore, the transistor switch Q2 is turned on, another DC signal or an alternating suppressing signal is sent to the non-selected sensing electrode SE through the signal line R2 and the transistor switch Q2. The non-selected sensing electrode SE can be prevented from noise, which is excessive when the non-selected sensing electrode SE is floating.

With reference to FIG. 4B, if the transistor switches Q1 and Q2 are complementary transistors, for example, the transistor switch Q1 is PMOS transistor and the transistor switch Q2 is NMOS transistor (vice versa), one gate line can be eliminated and substantially the same function as FIG. 4A can be realized. When the sensing electrode SE is selected for sensing fingerprint, the signal at the gate line GY1 is logical high. The transistor switch Q1 is turned on and the transistor switch Q2 is turned off, the capacitance excitation signal is sent to the sensing electrode SE through the signal line S1 and the transistor switch Q1, and at this time, the fingerprint sensing signal detected at the sensing electrode SE is sent to the reading circuit through the transistor switch Q1 and the signal line S1. When the sensing electrode SE is non-selected for capacitance sensing, the gate line GY2 is logical high to turn on the transistor switch Q3, while the gate line GY 1 is logical low to turn on the transistor switch Q2. A DC signal or an alternating suppressing signal is sent to the non-selected sensing electrode SE through the signal line R1 and the transistor switches Q2 and Q3. Alternatively, when the sensing electrode SE is non-selected for capacitance sensing, the gate line GY2 is logical low to turn on the transistor switch Q4, while the gate line GY 1 is logical low to turn on the transistor switch Q2. Another DC signal or an alternating suppressing signal is sent to the non-selected sensing electrode SE through the signal line R2 and the transistor switches Q2 and Q4. The embodiment shown in FIG. 4B saves one gate line by using complementary transistor pair.

Figure 5:
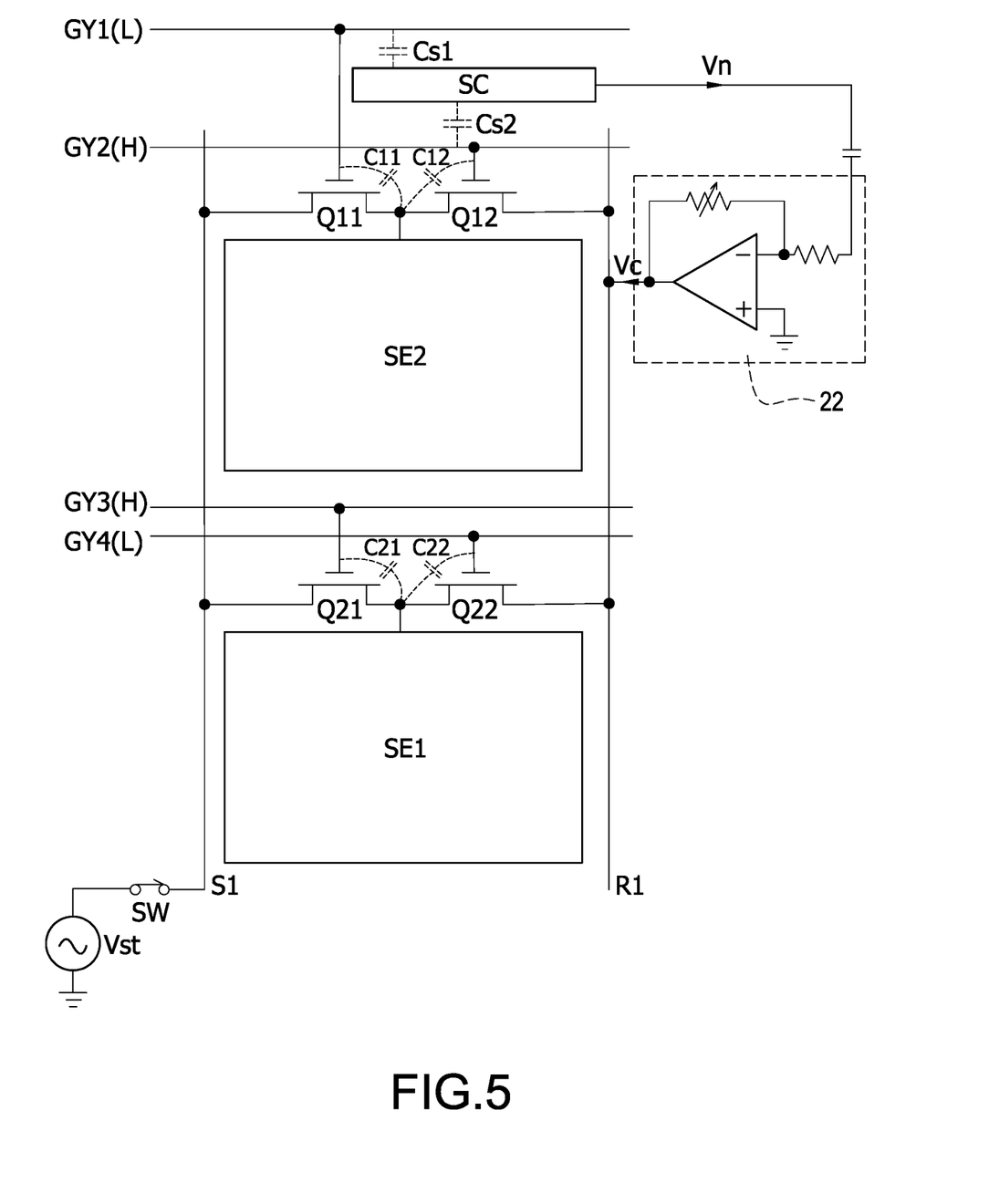
FIG. 5 is a schematic view showing the high-precision fingerprint sensing method according to the present invention.

FIG. 5 is a schematic view showing the high-precision fingerprint sensing method according to the present invention, where the noise-suppressing signal is applied to the non-selected sensing electrode. As mentioned above, if the noise-suppressing signal is applied to all or part of the non-selected sensing electrodes or applied to a common node, the noise of the fingerprint sensor 10 can be eliminated and the sensing accuracy can be enhanced. In this embodiment, the noise-suppressing signal is applied to all or part of the non-selected sensing electrodes. However, this embodiment is not limitation to the present invention. In the present invention, the noise-suppressing signal is applied to part of the non-selected sensing electrodes (or all of the non-selected sensing electrodes) or the noise-suppressing signal is applied to a common node (such as the negative voltage end VL of the DC power source shown in FIG. 2). As shown in FIG. 5, if the signal at the gate line GY3 is logical high and the signal at the gate line GY4 is logical low, the transistor switch Q21 is turned on and the transistor switch Q22 is turned off. At this time, the sensing electrode SE1 is selected sensing electrode. Moreover, the signal at the gate line GY1 is logical low and the signal at the gate line GY2 is logical high, the transistor switch Q11 is turned off and the transistor switch Q12 is turned on. At this time, the sensing electrode SE2 is non-selected sensing electrode. The capacitance-excitation signal Vst is sent to the drain or source of the transistor switch Q21 through switch SW and the signal line S1, and then sent to the selected sensing electrode SE1. A fingerprint sensing signal is read from the selected sensing electrode SE1 and through the signal line S1. At the time when performing fingerprint sensing for the selected sensing electrode SE1, the signal at the gate line GY2 is logical high and the signal at the gate line GY1 is logical low, the transistor switch Q12 is turned on and the transistor switch Q11 is turned off such that the capacitance-excitation signal Vst will not sent to the non-selected sensing electrode SE2 through the signal line S1 and the transistor switch Q11. Coupling capacitances Cs1 and Cs2 are respectively formed between the sampling conductor SC and the gate lines GY1, GY2. The noise signal Vn coming from the adjacent gate lines and sensed by the sampling conductor SC is sent to an inverter circuit 22 of the fingerprint sensing circuit 20 and then invert-amplified into a noise-suppressing signal Vc. The noise-suppressing signal Vc is sent to the non-selected sensing electrode SE2 through the signal line R1 and the transistor switch Q12, thus suppress the noise, which is from the inter-electrode capacitances C11, C12, C21, C22 of the transistor switches and coupled to the sensing electrodes, and enhance fingerprint sensing accuracy.

Figure 6:
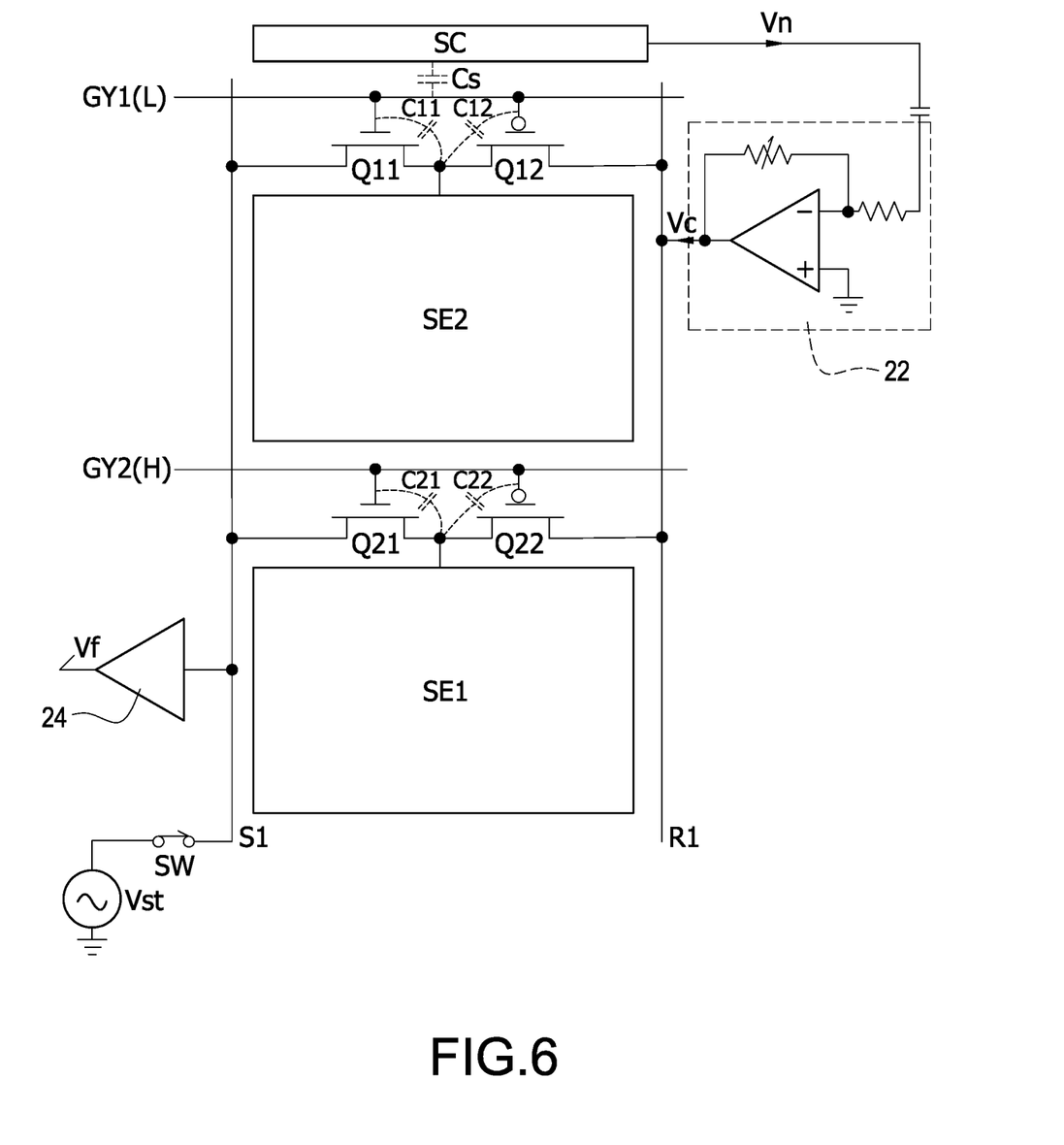
FIG. 6 is a schematic view showing the high-precision fingerprint sensing method according to the present invention.

FIG. 6 is a schematic view showing the high-precision fingerprint sensing method according to the present invention, where the noise-suppressing signal is also applied to the non-selected sensing electrode. This embodiment is similar to that shown in FIG. 5 and also follows the way in FIG. 4B, namely, saving one gate line by using complementary transistor pair. If the signal at the gate line GY1 is logical low and the signal at the gate line GY2 is logical high, the transistor switch Q21 is turned on and the transistor switch Q22 is turned off. At this time, the sensing electrode SE1 is selected sensing electrode. The capacitance-excitation signal Vst is sent to the drain or source of the transistor switch Q21 through switch SW and the signal line S1, and then sent to the selected sensing electrode SE1. A fingerprint sensing signal is read from the selected sensing electrode SE1 and amplified through the amplifier 24 to become fingerprint signal Vf. Besides, at this time, the transistor switch Q12 is turned on and the transistor switch Q11 is turned off (because the signal at the gate line GY1 is logical low). The sensing electrode SE2 is non-selected sensing electrode. The capacitance-excitation signal Vst is not sent to the drain or source of the transistor switch Q11 through the signal line S1. Therefore, the capacitance-excitation signal Vst is not sent to the non-selected sensing electrode SE2. Coupling capacitances Cs1 is formed between the sampling conductor SC and the gate line GY1. The noise signal Vn coming from the adjacent gate lines and sensed by the sampling conductor SC is sent to an inverter circuit 22 of the fingerprint sensing circuit 20 and then invert-amplified into a noise-suppressing signal Vc. The noise-suppressing signal Vc is sent to the non-selected sensing electrode SE2 through the signal line R1 and the transistor switch Q12, thus suppress the noise, which is from the inter-electrode capacitances C11, C12, C21, C22 of the transistor switches and coupled to the sensing electrodes, and enhance fingerprint sensing accuracy.

Figure 7:
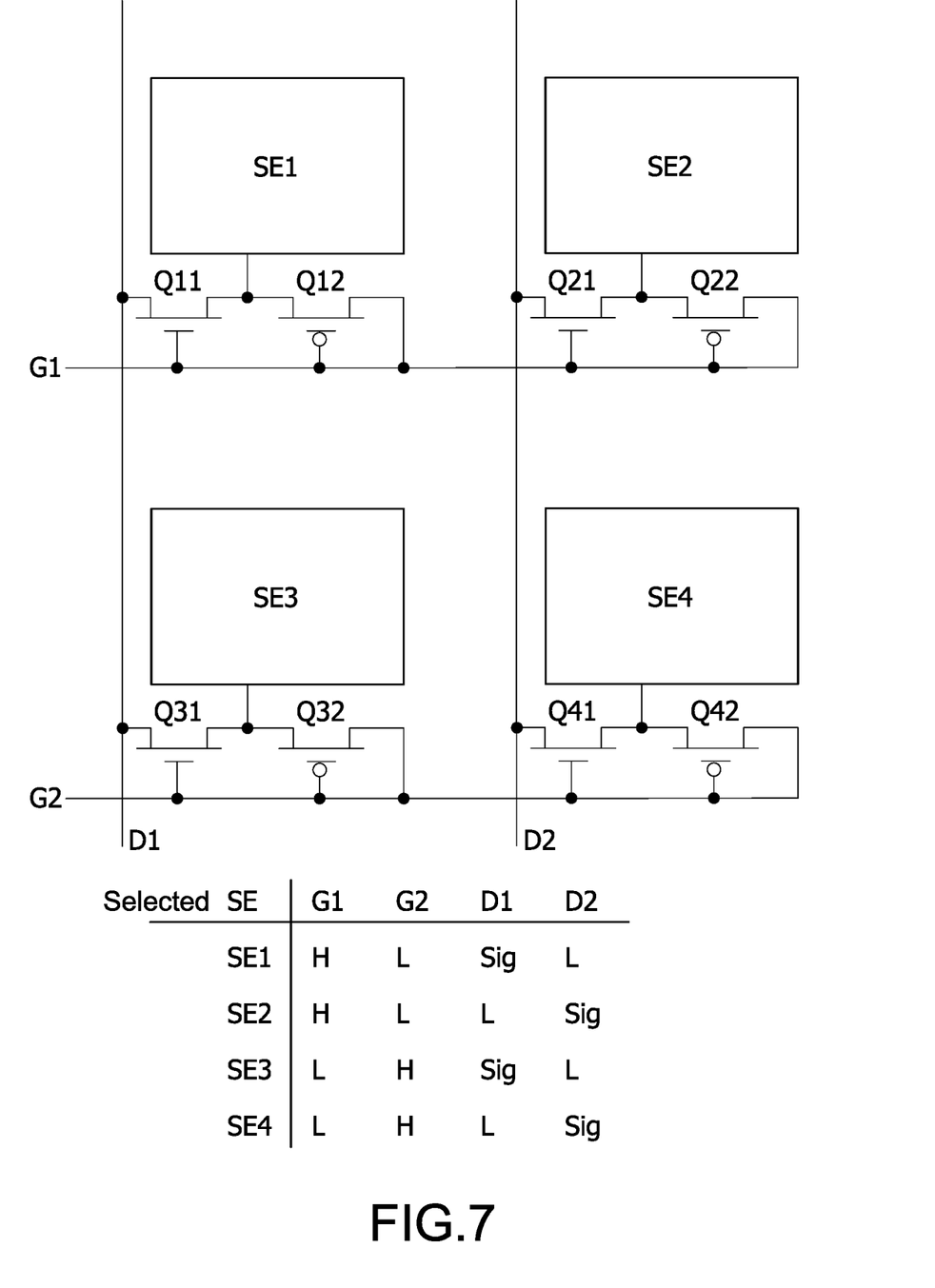
FIG. 7 is a schematic view showing the high-precision fingerprint sensing method according to another embodiment of the present invention.

FIG. 7 is a schematic view showing the high-precision fingerprint sensing method according to another embodiment of the present invention. This embodiment uses complementary transistor switches and connects the source (or drain) of the transistor switch to the gate of the transistor switch to further simplify wiring, namely, saving data line. If the signal at the gate line G1 is logical high and the signal at the gate line G2 is logical low, and if the capacitance-excitation signal is sent from the data line D1 (therefore, the data line D2 is logical low), at this time, the sensing electrode SE1 is selected sensing electrode while other sensing electrodes SE2, SE3, SE4 are non-selected sensing electrodes. The source (or drain) of the transistor switch Q12 is electrically connected to the gate thereof, therefore, the gate line G1 can also be used as data line for sending the sensing signal and the gate line G1 receives the fingerprint sensing signal from the selected sensing electrode SE1.

Moreover, the gate line G2 is logical low because it is connected to the negative voltage end of the DC power source. Therefore, the embodiment in FIG. 7 may include circuit shown in FIG. 2 (such as the sampling conductor SC and the fingerprint sensing circuit 20). Similarly, in the embodiment shown in FIG. 7, the fingerprint sensing circuit 20 also processes the noise signal sensed by the sampling conductor SC (for example, it can be placed adjacent to the gate line shown in FIG. 7) into noise-suppressing signal and supplies the noise-suppressing signal to the negative voltage end of the DC power source.

For the non-selected sensing electrodes SE3, SE4, the gate line G2 is logical low because it is connected to the negative voltage end of the DC power source. The noise-suppressing signal sent to the negative voltage end of the DC power source can also be sent to the non-selected sensing electrodes SE3, SE4 through the transistor switch Q32 and the transistor switch Q42, thus eliminate the noise of the fingerprint sensor 10 and enhance the sensing accuracy. For non-selected sensing electrode SE2, the data line D2 is also logical low because it is connected to the negative voltage end of the DC power source, the non-selected sensing electrode SE2 is connected to the drain or the source of the transistor switch Q21. The noise-suppressing signal sent to the negative voltage end of the DC power source can also be sent to the non-selected sensing electrode SE2 through the transistor switch Q21, thus eliminate the noise of the fingerprint sensor 10 and enhance the sensing accuracy.

If the signal at the gate line G1 is logical high and the signal at the gate line G2 is logical low, and if the capacitance-excitation signal is sent from the data line D2 (therefore, the data line D1 is logical low), at this time, the sensing electrode SE2 is selected sensing electrode while other sensing electrodes SE1, SE3, SE4 are non-selected sensing electrodes. If the signal at the gate line G1 is logical low and the signal at the gate line G2 is logical high, and if the capacitance-excitation signal is sent from the data line D1 (therefore, the data line D2 is logical low), at this time, the sensing electrode SE3 is selected sensing electrode while other sensing electrodes SE1, SE2, SE4 are non-selected sensing electrodes. If the signal at the gate line G1 is logical low and the signal at the gate line G2 is logical high, and if the capacitance-excitation signal is sent from the data line D2 (therefore, the data line D1 is logical low), at this time, the sensing electrode SE4 is selected sensing electrode while other sensing electrodes SE1, SE2, SE3 are non-selected sensing electrodes. In above three scenarios, the applying of the capacitance-excitation signal, the reading of the fingerprint sensing signal and the applying of the noise-suppressing signal can also be referred to the first scenario. The embodiment shown in FIG. 7 can supply the noise-suppressing signal to the negative voltage end of the DC power source and the non-selected sensing electrodes with reduced gate line and data line.

Figure 8A:
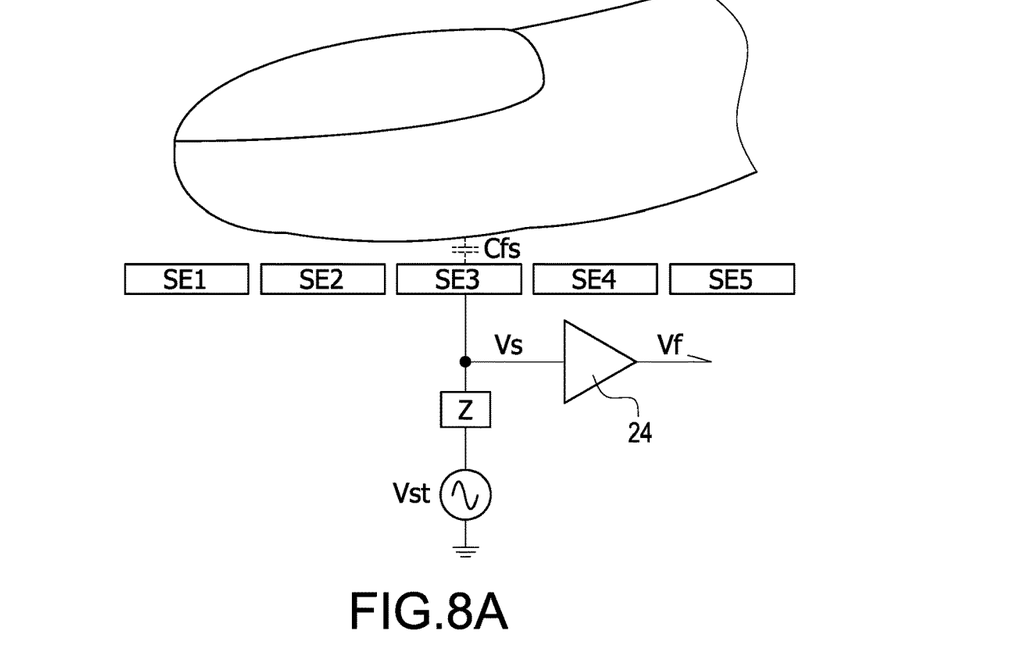
FIG. 8A is a schematic view showing the high-precision fingerprint sensing method according to still another embodiment of the present invention.

FIG. 8A is a schematic view showing the high-precision fingerprint sensing method according to still another embodiment of the present invention. The embodiment shown in FIG. 8A can be used with the embodiments in FIGS. 1~7 and is a self-capacitance scheme. As shown in this figure, the capacitance-excitation signal Vst is applied to a selected sensing electrode SE3 and the fingerprint sensing signal Vs is read from the selected sensing electrode SE3. The fingerprint sensing signal Vs is processed by the amplifier 24 to become a fingerprint signal Vf. Similarly, the noise-suppressing signal can be applied to part of the non-selected sensing electrodes (such as the non-selected sensing electrode SE1) or all of the non-selected sensing electrodes to eliminate the noise of the fingerprint sensor 10 and enhance the sensing accuracy.

Figure 8B:
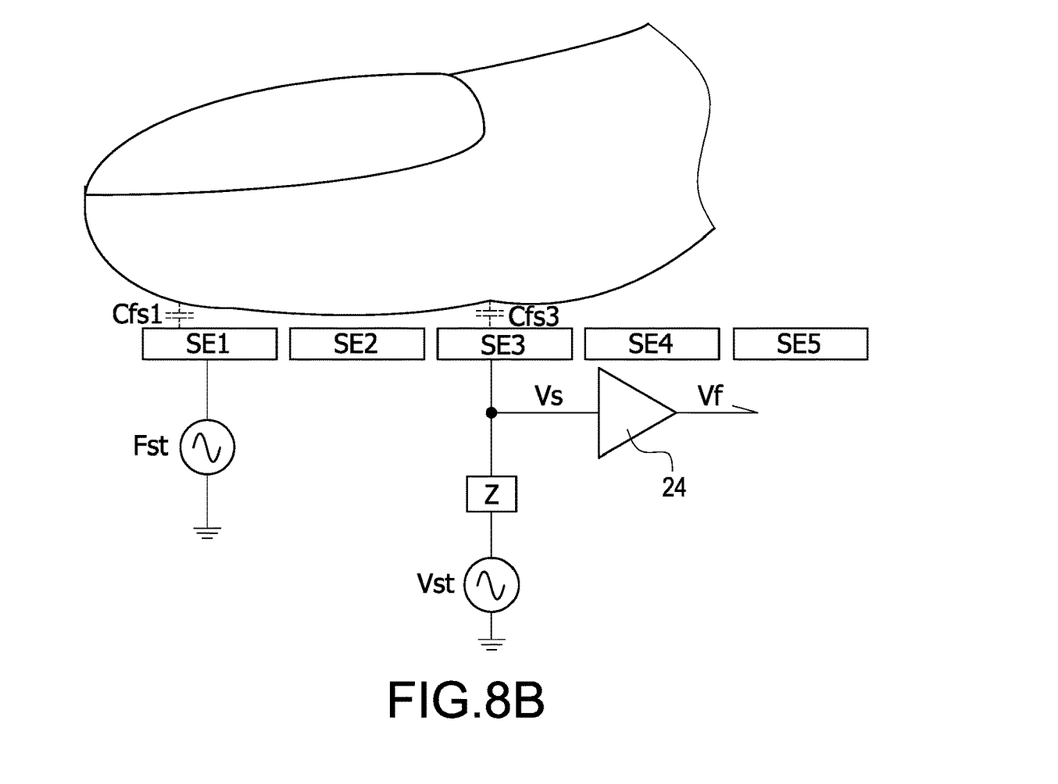
FIG. 8B is a schematic view showing the high-precision fingerprint sensing method according to still another embodiment of the present invention.

FIG. 8B is a schematic view showing the high-precision fingerprint sensing method according to still another embodiment of the present invention. The embodiment shown in FIG. 8B can be used with the embodiments in FIGS. 1~7 and is a self-capacitance/mutual-capacitance hybrid scheme. Besides applying the capacitance-excitation signal Vst and using the sampling conductor to provide the noise-suppressing signal, the embodiment in FIG. 8B also provides finger-excitation signal Fst and the finger-excitation signal Fst is applied to at least part of the non-selected sensing electrodes. As shown in FIG. 8B, the sensing electrode SE3 is the selected sensing electrode, then the finger-excitation signal Fst is applied to part of the non-selected sensing electrodes (such as the non-selected sensing electrode SE1) or all of the non-selected sensing electrodes. The finger-excitation signal Fst generates a sensing capacitance Cfs1 between user finger and the non-selected sensing electrode SE1. The finger-excitation signal Fst has same phase, inverted phase, different phase, same frequency or different frequency with the capacitance-excitation signal Vst, thus further enhance the fingerprint sensing accuracy besides eliminating noise in the fingerprint sensor 10.

Figure 9A:
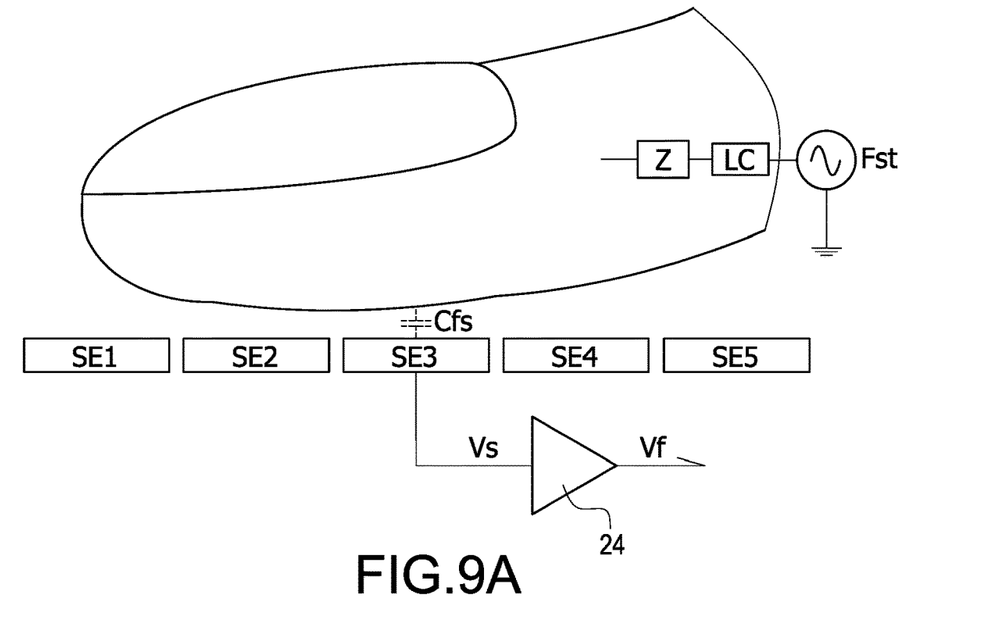
FIG. 9A is a schematic view showing the high-precision fingerprint sensing method according to still another embodiment of the present invention.

FIG. 9A is a schematic view showing the high-precision fingerprint sensing method according to still another embodiment of the present invention. The embodiment shown in FIG. 9A can be used with the embodiments in FIGS. 1~7 and is a mutual-capacitance scheme. The embodiment in FIG. 9A further provides finger-excitation signal Fst and the finger-excitation signal Fst is applied to user finger through a link conductor LC. A link impedance Z is formed between the user finger and the link conductor LC. The link impedance Z may be a capacitive impedance (for example, the link conductor LC is connected to the user finger through an insulating layer) or a resistant impedance (for example, the ink conductor LC is a touch line or a touch ring such that it is in direct contact with the user finger). During fingerprint sensing operation, the finger-excitation signal Fst is applied to user finger through the link conductor LC. The fingerprint sensing signal Vs is read from the selected sensing electrode SE3 and then amplified by the amplifier 24 to become the fingerprint signal Vf. Similarly, the noise-suppressing signal can be applied to part of the non-selected sensing electrodes (such as the non-selected sensing electrode SE1) or all of the non-selected sensing electrodes to eliminate the noise of the fingerprint sensor 10 and enhance the sensing accuracy. In the embodiment shown in FIG. 9A, the link conductor LC is a touch wire, a touch ring (such as the touch ID metal ring), an electrode or a sensing electrode.

Figure 9B:
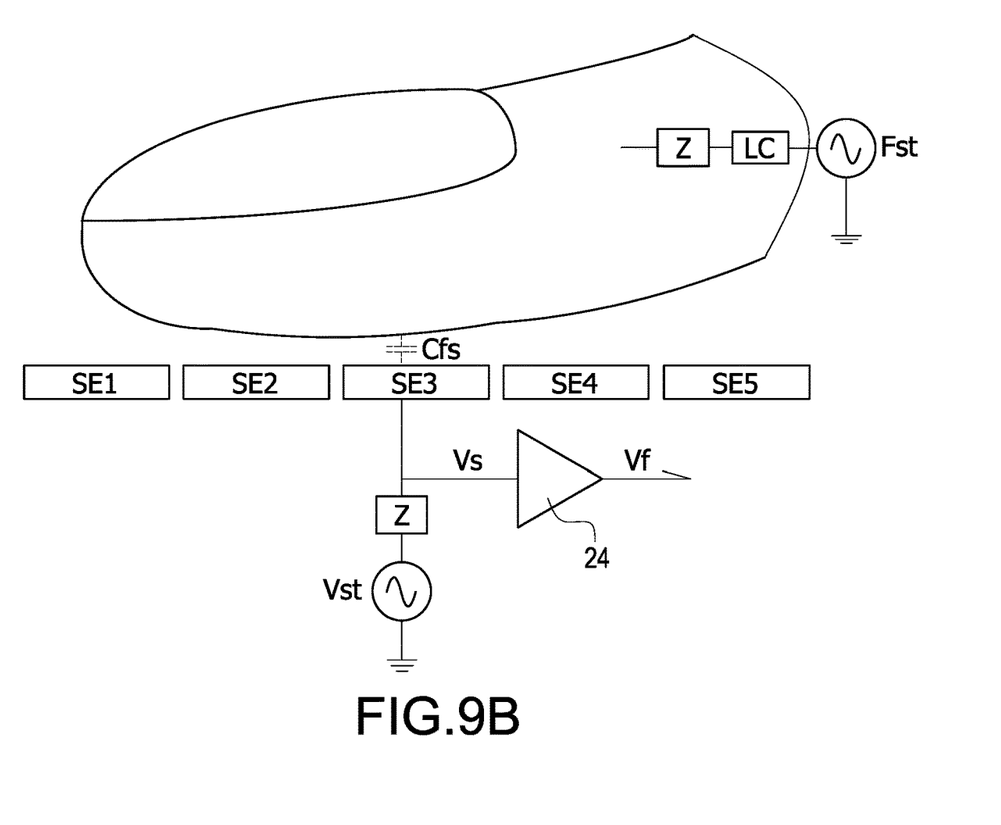
FIG. 9B is a schematic view showing the high-precision fingerprint sensing method according to still another embodiment of the present invention.

FIG. 9B is a schematic view showing the high-precision fingerprint sensing method according to still another embodiment of the present invention. The embodiment shown in FIG. 9B can be used with the embodiments in FIGS. 1~7 and is a self-capacitance/mutual-capacitance hybrid scheme. Besides applying the capacitance-excitation signal Vst and using the sampling conductor to provide the noise-suppressing signal, the embodiment in FIG. 9B also provides finger-excitation signal Fst and the finger-excitation signal Fst is applied to user finger through a link conductor LC. A link impedance Z is formed between the user finger and the link conductor LC. A link impedance Z is formed between the user finger and the link conductor LC, and the link impedance Z may be a capacitive impedance or a resistant impedance. During fingerprint sensing operation, the capacitance-excitation signal Vst is applied to the selected sensing electrode SE3, and the fingerprint sensing signal Vs is read from the selected sensing electrode SE3 and then amplified by the amplifier 24 to become the fingerprint signal Vf. Similarly, the noise-suppressing signal can be applied to part of the non-selected sensing electrodes (such as the non-selected sensing electrode SE1) or all of the non-selected sensing electrodes to eliminate the noise of the fingerprint sensor 10 and enhance the sensing accuracy. Besides, during fingerprint sensing operation, the finger-excitation signal Fst is applied to user finger through the link conductor LC. The finger-excitation signal Fst has same phase, inverted phase, different phase, same frequency or different frequency with the capacitance-excitation signal Vst, thus further enhance the fingerprint sensing accuracy besides eliminating noise in the fingerprint sensor 10. In the embodiment shown in FIG. 9B, the link conductor LC is a touch wire, a touch ring (such as the touch ID metal ring), an electrode or a sensing electrode.

To sum up, the high-precision fingerprint sensing method of the present invention can use the major noise sensed by the sampling conductor, invert-amplify the noise and then apply the invert-amplified noise to major conductor (such as non-selected sensing electrodes or the DC power end) to eliminate the noise in the fingerprint sensor.

Besides, the present invention also provides a finger-excitation signal having phase or frequency relationship with the capacitance-excitation signal to further enhance fingerprint sensing accuracy.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A high-precision fingerprint sensing method, comprising:
   providing a fingerprint sensor (10), the fingerprint sensor (10) comprising:
      a plurality of transistor switches (Q),
      a plurality of sensing electrodes (SE), each of the sensing electrodes (SE) electrically connected to sources or drains of at least two transistor switches (Q);
      a plurality of gate lines (GL), each of the gate lines (GL) electrically connected to gates of the transistor switches (Q);
      a plurality of data lines (DL), each of the data lines (DL) electrically connected to the sources or the drains of the transistor switches (Q);
   providing at least one sampling conductor (SC) near the gate lines (GL), a coupling capacitance (Cs) formed between the sampling conductor (SC) and each of the gate lines (GL) such that the at least one sampling conductor (SC) senses noise signal (Vn) from the adjacent gate lines (GL);
   providing a fingerprint sensing circuit (20), the fingerprint sensing circuit (20) sequentially or randomly selecting at least one sensing electrode (SE) as selected sensing electrode and reading a fingerprint sensing signal (Vs) from selected data line (DL) for fingerprint sensing; and
   inverting the noise signal (Vn) sensed by the sampling conductor (SC) to form a noise-suppressing signal (Vc) and supplying the noise-suppressing signal (Vc) to the fingerprint sensor (10), whereby noise in the fingerprint sensor (10) is eliminated and fingerprint sensing accuracy is enhanced.

2. The method in claim 1, wherein the noise-suppressing signal (Vc) is supplied to non-selected sensing electrode (SE) to enhance fingerprint sensing accuracy.

3. The method in claim 2, wherein the noise-suppressing signal (Vc) is supplied to the non-selected sensing electrode (SE) through other data line (DL) and the transistor switches (Q) corresponding to other sensing electrode (SE).

4. The method in claim 1, wherein the noise-suppressing signal (Vc) is supplied to a DC power end of the fingerprint sensor (10).

5. The method in claim 4, wherein the noise-suppressing signal (Vc) is supplied to a negative voltage end (VL) of the DC power source.

6. The method in claim 1, wherein each of the sensing electrodes (SE) is electrically connected to the sources or the drains of two transistor switches (Q), wherein in one of the two transistor switches (Q), the source or the drain is electrically connected to the gate of the transistor switch (Q).

7. The method in claim 1, wherein the fingerprint sensor (10) further comprises power switching switches (SW1, SW2), the power switching switches (SW1, SW2) are cut off during fingerprint sensing operation.

8. The method in claim 1, further providing a link conductor (LC) such that a link impedance (Z) is formed between user finger and the link conductor (LC), the link impedance (Z) is a capacitive impedance or a resistance impedance.

9. The method in claim 8, further comprising: sending a finger-excitation signal (Fst) to the user finger through the link impedance (Z) during fingerprint sensing.

10. The method in claim 9, further comprising: sending a capacitance-excitation signal (Vst) to the selected sensing electrodes (SE) through the selected data line (DL).

11. The method in claim 10, wherein the finger-excitation signal (Fst) has same phase, inverted phase, different phase, same frequency or different frequency with the capacitance-excitation signal (Vst).

12. The method in claim 8, wherein the link conductor (LC) is a touch wire, a touch ring, an electrode or a sensing electrode.

13. The method in claim 1, wherein a capacitance-excitation signal (Vst) is sent to the selected sensing electrode (SE) through the selected data line (DL).

14. The method in claim 1, wherein the noise-suppressing signal (Vc) suppresses noise of the gate, which is coupled to the sensing electrode (SE) through inter-electrode capacitance of the transistor switch (Q).

15. The method in claim 1, wherein the at least one sampling conductor (SC) is of elongated strip shape and parallel to the gate lines (GL).

16. The method in claim 1, wherein an inverter circuit (22) with programmable-control gain is used to invert-amplify the noise.

17. The method in claim 16, further comprising: gradually adjusting a gain of the inverter circuit (22) to increase or decrease the gain of the inverter circuit (22) during fingerprint sensing to obtain optimal noise suppressing effect.

* * * * *